| United States Patent [19] | [11] Patent Number: 4,689,421 |
|---|---|
| Mikroyannidis et al. | [45] Date of Patent: Aug. 25, 1987 |

[54] 1-[(DIORGANOOXYPHOSPHONYL)METHYL]-2,4- AND -2,6-DIAMINO BENZENES AND THEIR DERIVATIVES

[75] Inventors: John A. Mikroyannidis, Patras, Greece; Demetrius A. Kourtides, Gilroy, Calif.

[73] Assignee: The United States of America as represented by the Administrator of the National Aeronautics and Space Administration, Washington, D.C.

[21] Appl. No.: 641,152

[22] Filed: Aug. 16, 1984

Related U.S. Application Data

[63] Continuation-in-part of Ser. No. 522,629, Aug. 12, 1983, abandoned.

[51] Int. Cl.$^4$ .............................................. C07F 9/40
[52] U.S. Cl. .................................. 558/145; 558/190; 558/193
[58] Field of Search ................ 260/944, 954; 558/145, 558/190, 193

[56] References Cited

U.S. PATENT DOCUMENTS 3,134,800  5/1964  Kagan et al. ..................... 260/944
4,061,697  12/1977  Hubner et al. ..................... 558/193

OTHER PUBLICATIONS

"Synthetic Organic Chemistry", (1953), pp. 654–655 and 746–747.

*Primary Examiner*—Anton H. Sutto
*Attorney, Agent, or Firm*—Darrell G. Brekke; John R. Manning; Robert D. Marchant

[57] ABSTRACT

1-[(Diorganooxyphosphonyl)methyl]-2,4- and -2,6-dinitro- and diamino benzenes are prepared by nitrating an (organophosphonyl)methyl benzene to produce The dinitro compounds which are then reduced to the diamino compounds. The organo groups (alkyl, haloalkyl, aryl) on the phosphorus may be removed to give the free acids, $(HO)_2P(=O)$—. The diamino compounds may be polymerized with dianhydrides or diacyl halides to produce fire and flame resistant polymers which are useful in the manufacture of aircraft structures.

9 Claims, No Drawings

1-[(DIORGANOOXYPHOSPHONYL)METHYL]-2,4,- AND -2,6-DIAMINO BENZINES AND THEIR DERIVATIVES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

RELATED APPLICATIONS

This application is a continuation-in-part of our co-pending application Ser. No. 522,629, filed Aug. 12, 1983, now abandoned, which is directed to compounds and polymers having

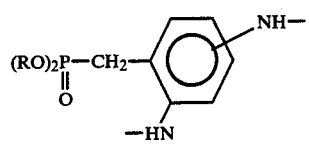

repeating units, which is incorporated herein by reference. The application is also related to the following commonly assigned patent applications: U.S. Ser. No. 641,142, filed Aug. 16, 1984, which is directed to the above mentioned compounds and polymers; U.S. Ser. No. 641,153, filed Aug. 16, 1984, which is directed to polyamides prepared from the present diaminobenzenes; U.S. Ser. No. 641,143 filed Aug. 16, 1984, now U.S. Pat. No. 4,536,565, which is directed to polyimides and copolyimides prepared from the present diaminobenzenes; and U.S. Ser. No. 641,147, filed Aug. 15, 1984, which is directed to maleimido and citraconimido-substituted derivatives of the present diaminobenzenes.

FIELD OF THE INVENTION

The invention relates to 1-[(dihydroxy- and diorganooxyphosphonyl)methyl]-2,4- and -2,6- dinitro benzenes, to the diamino products resulting from reduction of the nitro groups of the aforesaid dinitro compounds, to products (including mixtures and polymers) of the dinitro compounds and to methods of preparation of the dihydroxy, dinitro and diamino compounds. The polymers of this invention are fire and heat resistant having useful mechanical properties.

BACKGROUND OF THE INVENTION

Certain phosphorus-containing organic compounds are known to be fire retardant when mixed with or incorporated chemically in polymers. Among such phosphorus-containing compounds are diamino compounds which can, for example, be polymerized with diacyl halides or dianhydrides. It is known, for example, to incorporate phosphorus into 2,4-dinitrochlorobenzene by reacting the latter with diethyl phosphite resulting in 2,4-dinitrodiethoxy-phosphonyl benzene. By reducing the nitro groups, a diamine is produced. However, the yield of dinitro precursor to the diamino species is low, e.g., about 11%.

Some references of the inventors, which describe fire resistant compositions of phosphoruscontaining resins and the monomers thereof, include the following:

1. J. A. Mikroyannidis and D. A. Kourtides, "Fire-Resistant Compositions of Epoxy Resins with Phosphorus Compounds", Symposium on Rubber-Modified Thermoset Resins, 186th Annual American Chemical Society Meeting, Washington, D.C., Abstract PMSE 133, Aug. 28–Sept. 2, 1983;

2. J. A. Mikroyannidis and D. A. Kourtides, "Fire-Resistant Epoxy Resins Containing 1-(Di(2-Chloroethoxy phosphinyl) Methyl)-2,4- and 2,6 Diaminobenzene as Curing Agent", Proceedings of the 12th North American Thermal Analysis Society Conference, Williamsburg, Va. (September 1983);

3. J. A. Mikroyannidis and D. A. Kourtides, "Curing of Epoxy Resins with 1-[Di(2-Chloroethoxyphosphinyl)Methyl]-2,4- and 2,6-Diaminobenzene", *Journal of Applied Polymer Science*, Vol. 29, pp. 197–209, (1984);

4. J. A. Mikroyannidis and D. A. Kourtides, "Curing of Epoxy Resins with 1-[Di(2-Chloroethoxyphosphinyl)Methyl]-2,4- and 2,6-Diaminobenzene", National Aeronautics and Space Administration Report No. TM 84350, October 1983;

5. J. A. Mikroyannidis and D. A. Kourtides, "Synthesis and Characterization of Phosphorus-Containing Polyamides and Copolyamides based on 1-[Dialkoxyphosphinyl)Methyl]-2,4- and -2,6-Diaminobenzenes", *Journal of Applied Polymer Science*, Vol. 29, pp. 941–953 (1984);

6. J. A. Mikroyannidis and D. A. Kourtides, "Synthesis and Characterization of Phosphorus Containing Polyamides and Copolyamides Based on 1-[(Dialkoxyphosphinyl) Methyl]-2,4- and -2,6-Diaminobenzenes", Proceedings of the Society for the Advancement of Materials and Process Engineering, Reno, Nev. (April 1984); and 7. J. A. Mikroyannidis and D. A. Kourtides, "Curing of Epoxy Resins with 1-[Di(2-Chloroethoxyphosphinyl)Methyl]-2,4- and -2,6-Diaminobenzene", Proceedings of the Society of Plastics Industry Annual Spring Meeting, St. Louis, Mo. (May 1984).

These references are not considered to be prior art regarding this invention.

OBJECTS OF THE INVENTION

It is an object of the invention to provide a route to flame retardant diamino compounds containing phosphorus which is facile and provides good yields. These compounds when combined with epoxys, etc. provide polymers which are useful for lamination, which combine good fire and heat resistance with good mechanical properties.

BRIEF SUMMARY OF THE INVENTION

In accordance with the invention a phosphonylmethylbenzene having the general formula

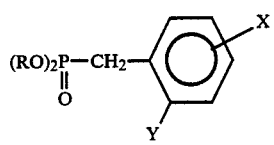

is provided and is polymerized with a monomer such as an epoxide, a dianhydride, etc. In 1x the R groups may be the same or different and they may be aliphatic, cycloaliphatic or aromatic, preferably being lower alkyl [methyl, ethyl, propyl (n and iso), etc.]and most advantageously contain a halogen such as chlorine. X and Y are functional groups which are polymerizable with, for example, epoxy or anhydride groups and they may be the same or different. Preferably X and Y are amino groups and they will be predominantly in the 2- and 4-positions relative to the phosphonyl methyl group. X and Y may also be hydroxyl, carboxyl, etc.

The resulting polymers combine one or more properties of heat resistance, low flammability and high char yield with good mechanical properties such as high tensile strength.

The reaction mixture may include other species such as, for example, a mixture of a diamine species of 1x, a conventional diamine such as m-phenylenediamine (MPD) or 4,4-diaminodiphenyl sulfone (DDS). These conventional species may serve to impart toughness and/or other desirable properties to the polymer.

In the invention, a phosphorus-containing precursor represented by the formula:

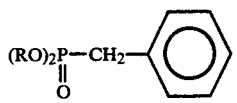

i.e., a phosphonyl methyl benzene in which the two phosphonyl hydroxyl groups are protected by R groups which are alkyl groups, aryl groups, substituted alkyl groups or other suitable protecting groups, is nitrated to produce a mixture of 2,4- and 2,6- dinitro compounds of the formula:

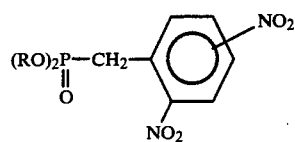

in which the second nitro group is in the 4- or 6-position. The dinitro compounds 2 are then reduced to produce the diamino compounds of the formula:

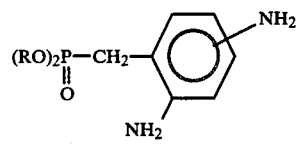

The protecting groups R may be removed by hydrolysis to produce the corresponding phosphonyl acids, (HO)$_2$P(=O)—, of 2 and 3. The two R's may also be replaced by a single bivalent group.

The amino groups of 3 may be reacted with acyl halides, R'(C=O)—X, to produce amides:

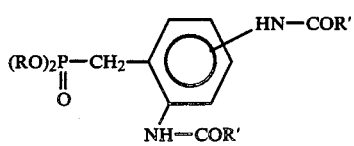

where R' is an organic group, such as alkyl or aryl or alkaryl containing, for example, 1 to 8 carbon alkyls, such as methyl, ethyl, butyl, cyclohexyl, octyl and 2-ethylhexyl, benzyl, phenyl, 2-ethylbenzyl, phenylethyl and the like, and X is a halo such as chloro or bromo.

The diamino compounds 3 may be polymerized with diacyl halides or dianhydrides to produce fire resistant thermoplastic polymers or with higher functionality acyl halides or anhydrides to produce fire resistant cross linked polymers.

DETAILED DESCRIPTION OF THE INVENTION

The process of this invention begins with nitration of a protected phosphonyl methyl benzene of the formula:

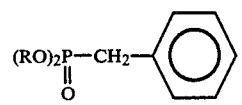

The two protecting groups R may be an alkyl, haloalkyl, or aryl group. Examples of R are methyl, ethyl, n- and iso-propyl, higher (e.g., C4 to C10) alkyl; haloalkyls of the same chain length such as chloro or bromoalkyls, especially chloroalkyl, such as 2-chloroethyl; aromatic groups, such as phenyl, and the like. Other equivalent non-nitratable R groups may be used as well. The two R groups are usually identical and may if desired be a single alkylene such as from 3 to 6 carbons bridging and protecting both phosphonyl hydroxyls. Preferred R groups are 1 to 4 carbon alkyls and haloalkyls and phenyls. Ethyl and 2-chloroethyl groups are the most preferred R groups.

Compound 1 may be produced by the Michaelis-Arbuzov reaction of benzyl bromide with a suitable trialkylphosphite or other equivalent protected phosphate. See, G. M. Kosolapoff and L. Maier, "Organic Phosphorus Compounds", Wiley Interscience, 1973, Vol. 7, page 184.

The nitration of compound 1 may be carried out by direct nitration. This may be effected by contacting the compound 1 with an excess beyond two equivalents of nitric acid in fuming sulfuric acid under anhydrous conditions at elevated temperatures. Generally, the amount of nitric acid is from about 2.1 to about 10 moles per mole of nitratable benzene rings. The elevated temperature is typically from about 40° C. to about 90° C., preferably about 45° C. to 65° C. This reaction generally takes from about 0.5 to about 8 hours to complete.

The product of this nitration is a mixture of 2,4 and 2,6 dinitro phosphonyl methyl benzenes of the formula:

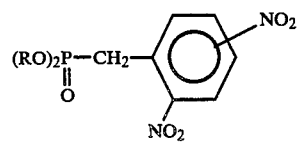

If desired, the isomers may be separated from one another, e.g., by crystallization, but for many purposes such separation is not necessary. The 2,4-isomer is greatly predominant and for most practical uses the mixture may be regarded as the 2,4-dinitro (and subsequent 2,4-diamino) compounds.

In the next step the dinitro compounds 2 are reduced to produce the diamino compounds of the formula:

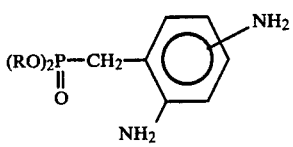

This reduction may be carried out by any of the methods known to the art for reducing nitro-containing aromatic compounds. A preferred method is catalytic reduction using molecular hydrogen and a supported catalyst such as a supported noble metal catalyst for example platinum or palladium on an inert organic oxidic support or carbon. This reduction is exothermic and can be conducted at temperatures from ambient (about 10° C.) to about 100° C. and hydrogen partial pressures of from about 1 atmosphere to 20 atmospheres or more. The reaction is continued until no more hydrogen is taken up. The reduction is carried out with the dinitro compound dissolved in a non-aqueous medium, for example, a lower alkanol such as methanol or ethanol.

The phosphonyl protecting groups "R" are acid labile and may be removed from either the dinitro compounds 2 or the diamino compounds 3 by acidic hydrolysis to produce the corresponding phosphonyl acids, $(HO)_2P(=O)$—. This hydrolysis is carried out in concentrated aqueous strong mineral acid, such as HCl, HBr or $H_2SO_4$, at elevated temperatures such as about 50° to 150° C. especially at reflux for from about 0.5 to 8 hours. This produces the phosphonyl acids corresponding to compounds 2 and 3.

The amino groups of the compounds of 3 may be reacted with acyl halides, R'(C=O)—X, to produce amides:

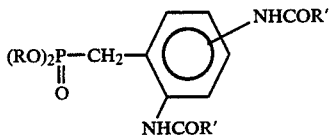

where R' is an organic group, such as alkyl or aryl or alkaryl, for example, 1 to 8 carbon alkyls, e.g., methyl, ethyl, butyl, cyclohexyl, octyl and 2-ethylhexyl, benzyl, phenyl, 2-ethylbenzyl, phenylethyl and the like, X is a halo such as chloro or bromo.

(Diamidophenyl)methyl phosphonic acid of the formula:

where R' is selected from alkyls such as C1 to C10 (e.g., methyl) and aryls (e.g., phenyl) and the two amido groups are in the 2,4 or 2,6 positions is prepared by reacting the compounds of formula 4 with strong aqueous mineral acid as described herein to selectively remove the R groups. Alternatively, the phosphonyl acids of structure 3 may be treated with the corresponding acyl halides, R'(C=O)—X, described herein to selectively react with the amine groups.

The diamino compounds 3 and their phosphonyl acids have excellent properties which give them several distinct utilities. The free phosphonic acids resulting from conversion of the dialkoxy groups to hydroxy groups may be used as complexing agents to extract metals from aqueous solutions, and they can also be used as corrosion inhibitors for metals.

The diamines of the present invention may also be used as curing agents for epoxy resins. They may be polymerized and copolymerized with a variety of dianhydrides and diacylchlorides (and with higher functionality anhydrides and acylchlorides), e.g., pyromellitic anhydride, the dianhydride

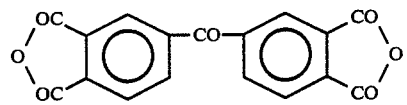

and isophthaloyl chloride, $1,3—[(C=O)Cl]_2\phi$.

These compounds are useful in the preparation of polymers which can be used as resin matrices for composites. The composites possess both high temperature resistance and fire resistance. These laminating and matrix resins can be combined with either glass, KEVLAR ® or graphite fibers in the form of either unidirectional tape or fabric which in turn can be fabricated into secondary composites, such as composite sandwich panels for aircraft interiors. Another application of these compounds is the use of these resins as encapsulating or potting compounds when the compounds are reacted with epoxy resins. These compounds will be more flame and fire-resistant when compared with conventional epoxy resins.

The present invention will be further described with reference to the following examples. These are presented to illustrate the invention and are not to be construed as limiting its scope which is defined by the appended claims.

EXAMPLE 1

1-[(Diethoxyphosphonyl)methyl]-2,4- and -2,6-dinitrobenzenes

[(Diethoxyphosphonyl)methyl]benzene (21.76 g, 95 mmol) was added dropwise to a mixture of fuming nitric acid (16.3 g) and fuming sulphuric acid (54.30 g), containing 30% $SO_3$, at 55° C. The addition of the phosphonate lasted 1 hour and subsequently the mixture was heated at the same temperature for another hour. The mixture was poured into 1 liter of ice water and extracted with chloroform (300 ml). The chloroform solution as washed with 5% sodium bicarbonate solution and with water, dried ($Na_2SO_4$) and concentrated to give a yellowish solid (24.16 g, 80%, mp 78°–82° C.). Recrystallizations from ether-chloroform (10:1 vol/vol) gave an analytical sample: mp 101°–104° C. The structure was confirmed by $^1$H-NMR and chemical analysis.

EXAMPLE 2

1-[(Diethoxyphosphonyl)methyl-2,4- and -2,6-diaminobenzenes

The recrystallized product of Example 1 (2.00 g, 6.28 mmol) was dissolved in 50 ml of absolute ethanol and a small amount of catalyst, 10% palladium on carbon, was added. The hydrogenation was carried out on a Parr apparatus under a pressure of 3.5 atm at room temperature until no more hydrogen was taken up (about 3 hrs). After the filtration of the catalyst and the removal of the volatile components under vacuum a viscous undistillable liquid was obtained (1.57 g, 97%), which could not be induced to crystallize.

The dihydrochloride salt was formed by passing anhydrous hydrochloride gas through its solution in chloroform. This salt was a nearly white solid and after recrystallizations from ethanol-ether (1:6 vol/vol) an analytical sample was obtained which was decomposed at temperature higher than 128° C. Structure was confirmed by $^1$H-NMR and chemical analysis.

EXAMPLE 3

1-[(Diethoxyphosphonyl)methyl]-2,4- and -2,6-di(benzoylamino)benzenes

Recrystallized dihydrochloride salt of the product of Example 2 (2.19 g, 6.6 mmol) and 20 ml of dried dichloromethane were placed in a flask equipped with a condenser. The diamine was formed in situ by addition of triethylamine (2.67 g, 26.4 mmol). Benzoylchloride (1.86 g, 13.2 mmol) was added to the mixture. An exothermic reaction was observed and the mixture was stirred under nitrogen for 5 minutes into an ice bath. The stirring was continued at room temperature for 2 hours. n-Hexane (about 100 ml) was added to the mixture to reprecipitate the produced dibenzoylamino derivatives as well as the salt, Et$_3$N.HCl. The mixture of these compounds was treated at room temperature with benzene (about 50 ml) which mainly dissolves the dibenzoylamines. Thus, the benzene filtrate by concentration under vacuum gave a white solid (2.36 g, 77%, mp 230°–233° C.). An analytical sample was obtained by recrystallizations from ethanol-acetonitrile (1:5 vol/vol), mp 231°–234° C. Structure was confirmed by $^1$H-NMR and chemical analysis.

EXAMPLE 4

1-[Di(2-chloroethoxyphosphonyl)methyl]-2,4- and -2,6-dinitrobenzenes

[Di(2-chloroethoxyphosphonyl)methyl]benzene (5.13 g, 17 mmol) was added dropwise to a mixture of fuming nitric acid (4.0 g) and fuming sulphuric acid (13.0 g), containing 30% SO$_3$ at 55° C. The addition of the phosphonate lasted 0.5 hour and subsequently the mixture was heated at the same temperature for 4 hours longer. The mixture was poured into 300 ml of ice water and extracted with chloroform (150 ml). The chloroform solution was washed with 5% sodium bicarbonate solution and with water, dried (Na$_2$SO$_4$) and concentrated to give a viscous liquid (4.92 g) which was diluted with about 100 ml of acetone-ether (1:10 vol/vol). Upon cooling of the solution, the dinitrobenzenes were crystallized (2.80 g, 42%, mp 79°–84° C.). Recrystallizations from acetone-ether (1:10 vol/vol) gave an analytical sample: mp 83°–85° C. Structure was confirmed by $^1$H-NMR and chemical analysis.

EXAMPLE 5

[Di(2-chloroethoxyphosphonyl)methyl]-2,4- and -2,6-diaminobenzenes

Recrystallized product of Example 4 (2.27 g, 58.6 mmol) was dissolved in 40 ml of absolute ethanol and a small amount of catalyst, 10% palladium on carbon, was added. The hydrogenation was carried out as described in Example 2. A solid product was obtained (1.88 g, 98%, mp 105°–109° C.). Recrystallizations from benzene gave an analytical sample: mp 116°–119° C. Structure was confirmed by $^1$H-NMR and chemical analysis.

EXAMPLE 6

1-[Di(2-chloroethoxyphosphonyl)methyl]-2,4- and -2,6-di(benzoylamino)benzenes

Recrystallized product of Example 5 (0.44 g, 1.35 mmol), dried dichloromethane (15 ml), triethylamine (0.27 g, 2.7 mmol) and benzoyl chloride (0.38 g, 2.7 mmol) were placed in a flask equipped with a condenser. The reaction as well as the isolation of the product was carried out as in Example 3. A white solid was obtained (0.58 g, 80%, mp 195°–198° C.). Structure was confirmed by $^1$H-NMR and chemical analysis.

EXAMPLE 7

1-[(Dihydroxyphosphonyl)methyl]-2,4- and -2,6-dinitrobenzenes

1-[(Diethoxyphosphonyl)methyl]-2,4- and -2,6-dinitrobenzenes (2.00 g, 6.3 mmol) from Example 3, were dissolved in concentrated hydrochloric acid (20 ml), and the solution was refluxed for 4 hours. After removal of the volatile components of the mixture under vacuum a white solid was obtained (1.30 g, 96%, mp 211°–214° C.). Recrystallizations from acetoneether (1:4 vol/vol) gave an analytical sample: mp 217°–219° C. Structure was confirmed by $^1$H-NMR and chemical analysis.

EXAMPLE 8

Polymerization of a Diamino Monomer

The dihydrochloride salt of 1-[(diethoxyphosphonyl)methyl]-2,4- and -2,6-diaminobenzene (2.21 g, 6.66 mmol), the dihydrochloride salt of m-phenylenediamine (6.21 g, 34.3 mmol), dimethylacetamide (70 ml) and pyridine (12.96 g, 163.84 mmol) were placed in a three-necked flask equipped with a mechanical stirrer and a dropping funnel. The mixture was stirred to obtain a solution and cooled to 0°–1° C. A solution of isophthaloyl chloride (8.32 g, 40.96 mmol) in dimethylacetamide (30 ml) was added dropwise under nitrogen atmosphere allowing the reaction to proceed 10 minutes with cooling and then 60 minutes at room temperature. The reaction mixture was added to about 700 ml of methanol and the product which precipitated was filtered, washed repeatedly with methanol and dried at 80° C. in a vacuum oven. The polymer (9.70 g, 90%) had an inherent viscosity 0.22 dl/g in sulphuric acid 98% (0.5% conc. at 25° C.) and contained 1.44% phosphorus. This polymer had a Limiting Oxygen Index value 52.0 and an anerobic char yield at 700° C. 72%. The poly-m-phenylene isophthalamide (Nomex) which may be considered as its parent polyamide had a Limited Oxygen Index 46.4 and an anerobic char yield 57%. (Oxygen index value was measured by the method of ASTM D 2863-70. Anerobic char yield was that described by Van Krevolin, *Polymer*, Vol. 16, pp. 615 ff (1975).

While the present invention has been described with reference to specific embodiments thereof, it will be understood by those skilled in this art that various changes may be made and that equivalent steps may be substituted without departing from the true spirit and scope of the present invention. All such modifications or changes are intended to be included within the scope of following claims.

We claim:

1. A method of producing a (diorganooxyphosphonyl) methyl diamino benzene which comprises providing dinitro compounds of the formula:

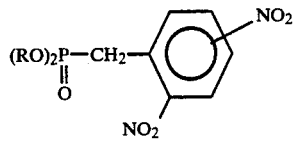

wherein R is an organo group selected form alkyls, having from C1 to C10 carbon atoms, phenyls, and halo-alkyls having from C1 to C10 carbon atoms, and where the two R groups may be a single alkylene having from 3 to 6 carbon atoms, and the two nitro groups are in the 2, 4 and 2, 6 positions, and subjecting said dinitro compounds to reduction conditions selected from molecular hydrogen with platinum on catalyst support or molecular hydrogen with palladium on a catalyst support at a pressure of between 1 and 20 atmospheres at a temperature of between about 10° and 100° C. in a non-aqueous medium to produce diamino compounds of the formula:

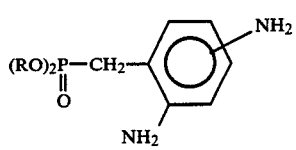

wherein the two amino groups are in the 2,4 and 2,6 positions.

2. The method of claim 1 wherein R is selected from ethyl and 2-chloroethyl.

3. The method of claim 2 wherein the diamino compound is primarily the 2, 4-compound.

4. A method of producing a (diorganooxyphosphonyl) methyl diamino benzene which comprises providing dinitro compounds of the formula:

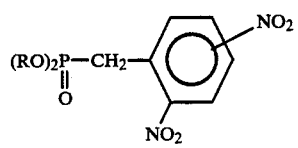

wherein R is an organo group selected from alkyls, phenyls, and substituted alkyls, and the two nitro groups are in the 2, 4 and 2,6, positions, and subjecting said dinitro compounds to reduction conditions selected from molecular hydrogen with platinum on a catalyst support or molecular hydrogen with palladium on a catalyst support at pressure of between 1 and 20 atmospheres at a temperature of between about 10° and 100° C. in a non-aqueous medium to produce diamino compounds of the formula:

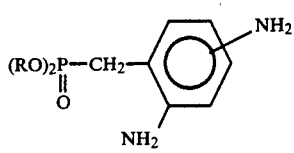

wherein the two amino groups are in the 2,4 and 2,6 positions.

5. The method of claim 4 wherein R is selected from ethyl and 2-chloroethyl.

6. The method of claim 5 wherein the diamino compound is primarily the 2,4 compound.

7. (Diorganooxyphosphonyl) methyl diaminobenzene of the formula:

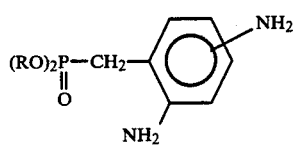

wherein R is an organo group selected from alkyls having from C1 to C10 carbon atoms, phenyls and haloalkyls having from C1 to C10 carbon atoms and where the two R groups may be a single alkylene having from 3 to 6 carbon atoms, and the two amino groups are in the 2,4 or 2,6 positions.

8. (Diorganooxyphosphonyl) methyl diaminobenzene of the formula:

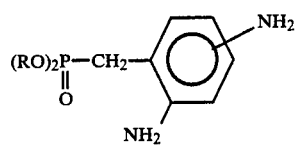

wherein R is an organo group selected from alkyls, phenyls and substituted alkyls and the two amino groups are in the 2,4 or 2,6 positions.

9. (Diorganooxyphosphonyl) methyl diaminobenzene of the formula:

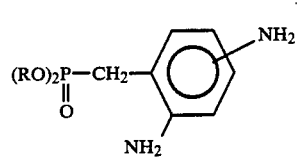

wherein R is ethyl or 2-chloroethyl and the two amino groups are in the 2,4 or 2,6 positions.

* * * * *